United States Patent [19]

Kelly

[11] Patent Number: 5,681,661

[45] Date of Patent: Oct. 28, 1997

[54] HIGH ASPECT RATIO, MICROSTRUCTURE-COVERED, MACROSCOPIC SURFACES

[75] Inventor: Kevin W. Kelly, Baton Rouge, La.

[73] Assignee: Board of Supervisors of Louisiana State University and Agricultural and Mechanical College, Baton Rouge, La.

[21] Appl. No.: 599,151

[22] Filed: Feb. 9, 1996

[51] Int. Cl.$^6$ ............... B23B 3/10; G10K 11/16; F01D 5/18

[52] U.S. Cl. ............... 428/601; 428/610; 428/612; 428/687; 416/235; 416/241 R; 416/241 B; 181/293; 181/286

[58] Field of Search ............... 428/687, 612, 428/601, 610, 609; 416/241 R, 241 B, 235, 236 R; 181/293, 294, 286; 165/133, DIG. 515

[56] References Cited

U.S. PATENT DOCUMENTS

| | | | |
|---|---|---|---|
| 3,232,371 | 2/1966 | Reichert et al. | 181/293 |
| 3,598,180 | 8/1971 | Moore | 165/133 |
| 4,258,783 | 3/1981 | Albertson et al. | 165/133 |
| 4,321,310 | 3/1982 | Ulion et al. | 428/612 |
| 4,549,606 | 10/1985 | Sato et al. | 265/DIG. 515 |
| 4,821,841 | 4/1989 | Woodward et al. | 181/286 |
| 4,886,572 | 12/1989 | Kimura et al. | 428/612 |
| 5,052,476 | 10/1991 | Sukumoda et al. | 165/133 |
| 5,075,175 | 12/1991 | Matsui et al. | 428/609 |
| 5,186,252 | 2/1993 | Nishizawa et al. | 165/133 |
| 5,366,814 | 11/1994 | Yamanishi et al. | 428/612 |

OTHER PUBLICATIONS

J. Jedliński, "Oxidation–Induced Degradation of Coatings on High Temperature Materials: An Overview," in N. Dahotre et al. (eds.), *Elevated Temperature Coatings: Science and Technology I*, pp. 75–83 (1995).

J. Jue et al., "Characterization of Yttria and Rare Earth–Oxide Doped Zirconia Materials for High Temperature Applications," in N. Dahotre et al. (eds.), *Elevated Temperature Coatings: Science and Technology I*, pp. 125–134 (1995).

S. Lau et al., "Degradation Mechanisms of Ceramic Thermal Barrier Coatings in Corrosive Environments," in S. Singhal (ed.), *Conf. Proc. 112th AIME*, pp. 305–317 (1983).

W. Rosenau et al., "Fins," *Heat, Mass, and Momentum Transfer*, pp. 106–109 (1961).

G. Diehl, "Machinery Sound Control," *Machinery Acoustics*, pp. 137–147 (1973).

*Primary Examiner*—John Zimmerman
*Attorney, Agent, or Firm*—John H. Runnels

[57] ABSTRACT

The performance of many macroscopic structures (those whose dimensions are on the order of centimeters, meters, or even larger) can be greatly improved by covering their surfaces with microstuctures. There are several applications in which "large," microstructure-covered sheets are useful. For example, dissimilar sheets of material that otherwise would not bond well to one another (such as a polymer and a metal) can be more strongly bonded with microstructures extending from one of the sheets and embedded into the other sheet. Such products make valuable laminate composites. As another example, the rate of heat transfer between an object and the surrounding medium can be dramatically changed (up or down) by covering the surface of the object with high aspect ratio microstructures, without significantly changing the component's size or weight. As compared to prior thermal barrier coatings, when microstructures are thus used to cover turbine blades the turbines can operate at substantially higher temperatures (as much as 290° C. higher than otherwise possible) and substantially higher pressures, while simultaneously reducing thermal stresses. Yet another application is the use of microstructures as acoustic absorbers, to reduce the amplitude of sound transmitted through a surface.

20 Claims, 5 Drawing Sheets

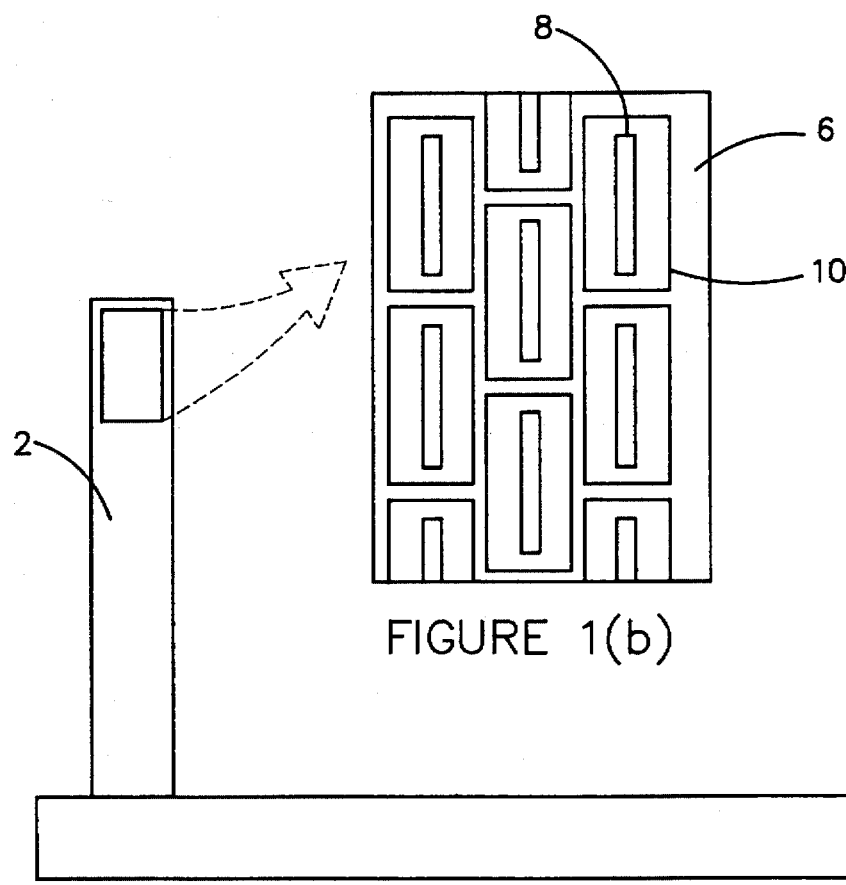
FIGURE 1(b)
FIGURE 1(a)
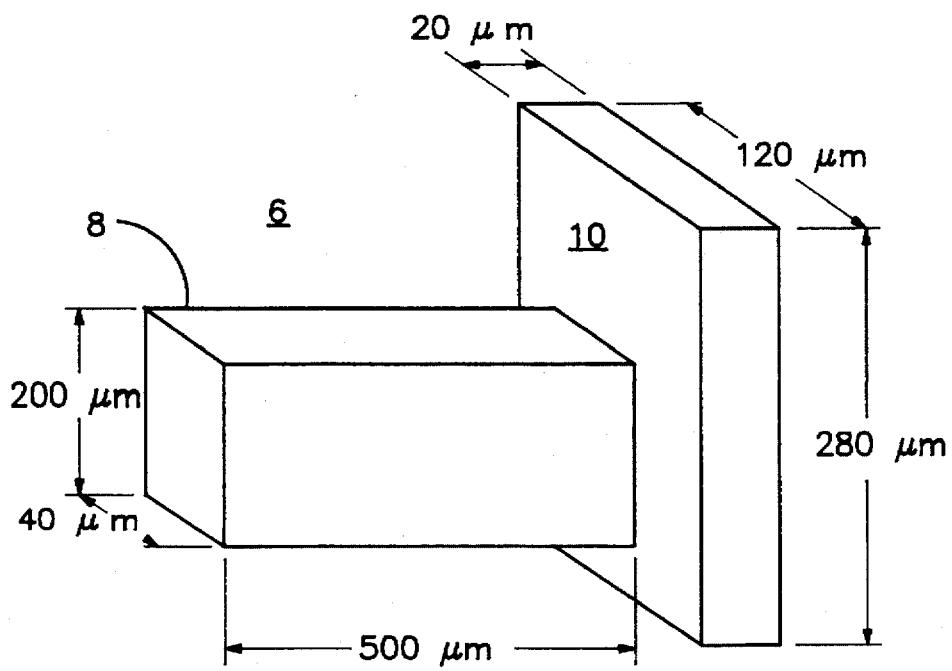
FIGURE 2

HIGH ASPECT RATIO, MICROSTRUCTURE-COVERED, MACROSCOPIC SURFACES

The development of this invention was funded by the Government under grant DABT63-95-C-0020 awarded by the Advanced Projects Research Agency. The Government has certain rights in this invention.

This invention pertains to macroscopic surfaces whose properties are altered by being covered with microstructures.

The properties of many macroscopic structures depend in large part on their surface properties. For example, the rate of heat transfer between a structure and its surroundings depends on the ease with which radiative, conductive, and convective heat transfer occur between the surface of the structure and the surroundings. As another example, the strength of composite materials is often governed by the strength of the bond between the "internal" surfaces joining the different lamina.

Efforts have been made to control the interaction of surfaces with their surroundings by painting, toughening, anodizing, hardening, plating, smoothing, and the like. In many cases, the resulting improvements in surface properties are relatively small.

One area where surface effects are important is the operation of gas turbines. The efficiency and power of a turbine increase as the maximum allowable gas inlet temperature increases. This allowable inlet temperature is a function of the composition of the turbine blades, and the balance of various modes of heat transfer into and out of the blade. Internal active cooling of turbine blades (a mode of heat removal), coupled with thermal barrier coatings on their surfaces (limiting heat transfer into the blades), allows the blades to operate at a relatively low temperature in an environment hundreds of degrees higher. A reduction in the rate at which heat is transferred from the surrounding combustion gases to the blade would allow operation at higher temperatures and efficiencies.

Prior thermal barrier coatings (TBC's) have typically consisted of a ceramic thermal insulating layer, such as partially-stabilized zirconia (PSZ), bonded to a superalloy substrate by an oxidation-resistant alloy bond coat, such as NiCrAlY. $ZrO_2$ is usually chosen as the ceramic material because the mismatch between its thermal expansion coefficient ($\alpha$) and that of the metallic Ni-alloy substrate is relatively small. The bond coat serves several purposes: (1) it has an $\alpha$ between that of the substrate and that of PSZ, reducing the effects of $\alpha$ mismatch; (2) it provides oxidation resistance (PSZ is not a good barrier against oxidation); and (3) it promotes adhesion of the PSZ layer. See, e.g., J. Jedliński, "Oxidation-Induced Degradation of Coatings on High Temperature Materials: An Overview," in N. Dahotre et al. (eds.), *Elevated Temperature Coatings: Science and Technology I*, pp. 75–83 (1995); J. Jue et al., "Characterization of Yttria and Rare Earth-Oxide Doped Zirconia Materials for High Temperature Applications," in N. Dahotre et al. (eds.), *Elevated Temperature Coatings: Science and Technology I*, pp. 125–134 (1995); and S. Lau et al., "Degradation Mechanisms of Ceramic Thermal Barrier Coatings in Corrosive Environments," in S. Singhal (ed.), *Conf. Proc.* 112th AIME, pp. 305–317 (1983).

Both the thermal efficiency and the power output of a turbine rise as the pressure ratio and the accompanying inlet temperature increase. For example, using estimates of turbine performance based on the Brayton cycle and standard cold air assumptions, a turbine receiving air at 300° K. with a compressor ratio of 13, and operating at a maximum turbine inlet temperature of 1400° K. has a thermal efficiency of 52% and a work output per kilogram of incoming air of 404 kJ/kg. The same turbine, with the same added heat/kg, but at a maximum turbine inlet temperature of 1600° K. can operate at a higher pressure ratio, will have a thermal efficiency of 63.5%, and will have work output per kilogram of incoming air of 494 kJ/kg.

Prior work on microstructures (those whose dimensions are smaller than about 1 mm) has focused almost entirely on "microscopic" uses of microstructures. Little consideration has been given to "macroscopic" applications of microstructures, i.e., the use of microstructures to affect the interactions between macroscopic objects and their surroundings.

No prior method for optimizing heat transfer between the surface of a structure and its surroundings has used microstructures. Prior methods for modifying heat transfer have included radiation heat shields, heat fins, and painted, polished, or roughened surfaces. See, e.g., W. Rosenau et al., "Fins," *Heat, Mass, and Momentum Transfer*, pp. 106–109 (1961).

No prior method of acoustic dampening has used microstructures. Prior methods of acoustic dampening have included the use of insulating layers; absorptive baffles; and "active," microprocessor-controlled cancellation of sound through the use of "complementary," out-of-phase sound waves. See, e.g., G. Diehl, "Machinery Sound Control," *Machinery Acoustics*, pp. 137–147 (1973).

No prior work on composite materials has used microstructures to improve bonding between layers of a composite. Prior methods of bonding laminates have generally used chemical bonding techniques.

It has been discovered that the performance of many macroscopic structures (those whose dimensions are on the order of centimeters, meters, or even larger) can be greatly improved by covering their surfaces with microstructures.

There are several applications in which "large," microstructure-covered sheets are useful. For example, dissimilar sheets of material that otherwise would not bond well to one another (such as a polymer and a metal) can be more strongly bonded with microstructures extending from one of the sheets and embedded into the other sheet. Such products make valuable laminate composites.

As another example, introducing microstructures to a sheet of material can dramatically change the surface properties of the sheet, such as its surface energy, radiation absorptivity and emissivity, ability to absorb mechanical and acoustic energy, etc. For example, the rate of heat transfer between an object and the surrounding medium can be dramatically changed by covering the surface of the object with high aspect ratio microstructures, without significantly changing the object's size or weight.

Applying a field of microstructures to a surface of macroscopic dimensions (cm$^2$ or m$^2$) to alter heat and/or momentum transfer with the surrounding medium has tremendous advantages. For example, assume that a heat shield is needed to reduce the heat flow between a surface and its surroundings. Also assume that the heat shield must be rigidly attached to the surface, that the heat shield will be subjected to large loads, that both the structure and the heat shield undergo large cyclic variations in temperature, and that the weight and dimensional changes introduced by the heat shield should be minimal. Using conventional methods, it is difficult if not impossible to make a heat shield that simultaneously satisfies each of these design considerations. However, a heat shield satisfying each of these criteria may readily be made with a field of microstructures that is attached to the surface or built on the surface.

The size of the thermal boundary layer at a fluid-solid interface is often on the order of hundreds of micrometers.

Arrays of microstructures can be built on a surface to effectively trap a layer of stagnant fluid near the surface. The thermal resistance resulting from the stagnant fluid layer is of the same magnitude as the convective resistance. A tremendous increase in thermal resistance results from covering a surface with a canopy of microstructures a few hundred microns from the substrate surface (for example, on the surface of a turbine blade). The individual "umbrellas" in this canopy are more-or-less rigidly connected to the substrate by microposts. The canopy greatly reduces both convective and radiative heat transfer from the surrounding environment to the substrate. Particularly when used in conjunction with internal cooling of the substrate, the temperature of the substrate will be far lower than has previously been possible in otherwise similar environments. For example, as compared to prior thermal barrier coatings, when such microstructures are used to cover turbine blades the turbines can operate at substantially higher temperatures (as much as 290° C. higher than otherwise possible) and substantially higher pressures, while simultaneously reducing thermal stresses. The novel barrier canopies, coupled with state-of-the-art internal cooling systems, will allow operation of turbines having inlet gas temperatures as high as 1427° C. (2600° F.).

An example is an article of manufacture comprising a heat barrier to reduce heat transfer between an object and the surroundings, wherein: (a) the object has a first face whose surface area is at least about 10 cm$^2$; (b) said heat barrier comprises a plurality of at least about 10 microstructures per cm$^2$ of surface area of the first face; (c) each of said microstructures comprises a shield and a post, wherein each of said shields comprises a distal face and a proximal face, and wherein each of said posts comprises a distal end and a proximal end; (d) said distal end of said post of each of said microstructures is connected to said proximal face of said shield of said microstructure; (e) said proximal end of said post of each of said microstructures is connected to the first face of the object; (f) the surface area of the distal face of each of said shields is at least about 0.001 mm$^2$; and (g) the distance between the proximal face of each of said shields and the first face of the object is between about 0.01 mm and about 2.0 mm; whereby total heat transfer between the object and the surroundings is substantially less than would be the heat transfer between an otherwise identical object lacking said heat barrier and the surroundings.

Preferably: said heat barrier comprises a plurality of at least about 5000 microstructures per cm$^2$ of surface area of the first face; (b) the surface area of the distal face of each of said shields is at least about 0.01 mm$^2$; and (c) the distance between the proximal face of each of said shields and the first face of the object is between about 0.1 mm and about 1.0 mm.

In an alternative embodiment, if the "umbrellas" in the canopy are so large that they merge into one another, a continuous wall is formed that is connected to the underlying object by numerous microposts.

An example is an article of manufacture comprising a heat barrier to reduce heat transfer between an object and the surroundings, wherein: (a) the object has a first face whose surface area is at least about 10 cm$^2$; (b) said heat barrier comprises a substantially continuous layer that is substantially parallel to said first face, and that is connected to said first face by a plurality of at least about 10 microstructures per cm$^2$ of surface area of the first face; (c) each of said microstructures comprises a distal end and a proximal end; (d) said distal end of each of said microstructures is connected to said substantially continuous layer; (e) said proximal end of each of said microstructures is connected to the first face of the object; and (f) the distance between said substantially continuous layer and the first face of the object is between about 0.01 mm and about 2.0 mm; whereby total heat transfer between the object and the surroundings is substantially less than would be the heat transfer between an otherwise identical object lacking said heat barrier and the surroundings.

Preferably, the distance between said substantially continuous layer and the first face of the object is between about 0.1 mm and about 1.0 mm.

In another alternative embodiment, no canopies are used in the heat shield; rather, each microstructure forms a wall (or alternatively, a box) substantially perpendicular to the face of the object being shielded, to partially enclose and thereby inhibit convective flow of the fluid near the face. The wall is preferably at least about 0.5 mm tall in the direction perpendicular to the face, more preferably about 1.0 mm; and the interior of the region bounded by the wall and capable of partially enclosing the fluid preferably has a width of 10–50 µm, preferably about 20 µm, and a height/cavity width ratio between 5 and 100, preferably between 10 and 20. (The "cavity width" is the distance between adjacent walls.)

An example is an article of manufacture comprising a heat barrier to reduce heat transfer between an object and the surroundings, wherein: (a) the object has a face whose surface area is at least about 10 cm$^2$; (b) said heat barrier comprises a plurality of at least about 10 microstructures connected to said first face, wherein adjacent microstructures are spaced between about 10 µm and about 500 µm apart from one another; and (c) each of said microstructures comprises a wall substantially perpendicular to said face, to partially enclose and thereby inhibit heat transfer near said face, wherein said wall is at least about 0.1 mm tall in the direction perpendicular to said face, and wherein the height of said microstructures is at least about 5 times the distance between adjacent microstructures; whereby total heat transfer between the object and the surroundings is substantially less than would be the heat transfer between an otherwise identical object lacking said heat barrier and the surroundings.

Preferably: adjacent microstructures are spaced between about 20 µm and about 50 µm apart from one another; wherein said wall is at least about 0.5 mm tall in the direction perpendicular to said face; and wherein the height of said microstructures is at least about 10 times the distance between adjacent microstructures.

The novel thermal barrier has significantly higher resistance to heat transfer than do existing film coatings such as those made of zirconium dioxide. The novel thermal barrier also greatly reduces the thermal stresses that can otherwise occur at the substrate-coating interface as a result of thermal expansion coefficient mismatch during thermal cycling.

Yet another application is the use of microstructures as acoustic absorbers, to reduce the amplitude of sound transmitted through a surface. Covering the surface with appropriate microstructures can reduce the amplitude of transmitted vibrations, and can therefore reduce the amplitude of the sound transmitted to the surrounding medium.

BRIEF DESCRIPTION OF THE DRAWINGS

FIGS. 1(a) and 1(b) illustrate schematically an embodiment of a turbine blade in accordance with the present invention.

FIG. 2 illustrates a preferred geometry for microstructures used to cover a turbine blade.

Thermal barriers; application to turbine blades

Figure 3A:
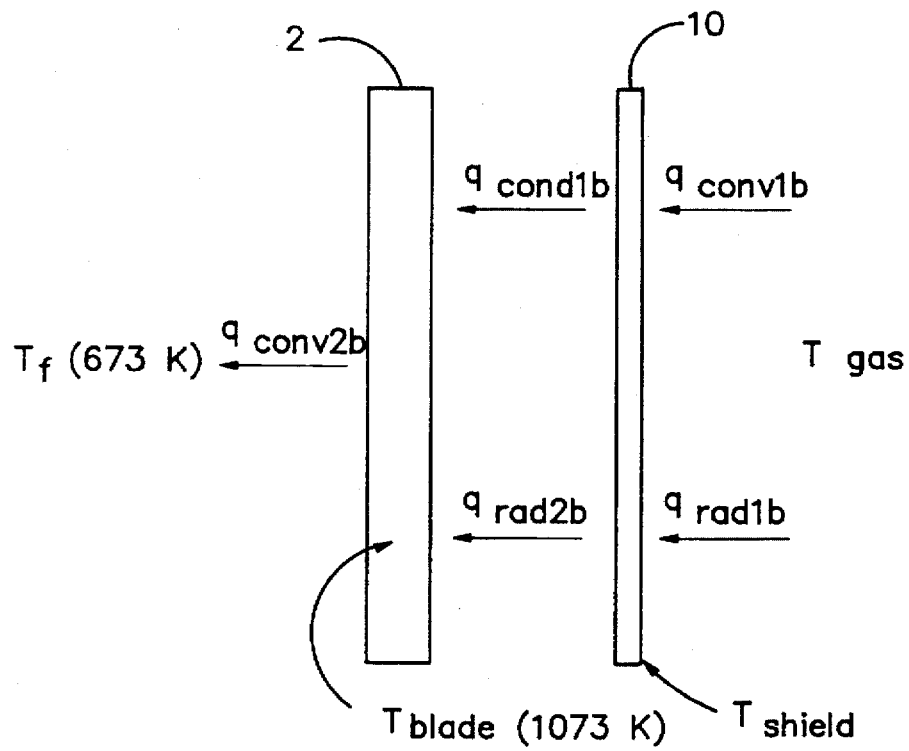
FIGS. 3(a) and 3(b) illustrate heat flow through a surface with and without a microstructure canopy, respectively.

In a preferred embodiment, the microstructures of the present invention will be manufactured with the LIGA process. A mold insert will be manufactured to mold or emboss a pattern of microstructures into a thin film of polymer. Molding allows the large-scale manufacture of microstructures without the repeated use of a synchrotron radiation source. The polymer film, containing voids where structures in the mold insert were present, is applied to the blade surface. An electroplating process then fills voids in the polymer with metal, thereby building a field of microstructures on the blade surface. By overplating beyond the height of the polymer, caps can be grown on top of the posts if desired; if the caps are allowed to grow large enough, they can form a continuous wall connected to the substrate by numerous microposts. Following the electroplating process, the polymer film is removed, for example with a solvent, leaving a metallic microstructure canopy on the surface.

It is preferred that there be a smooth transition from a material at the base of the microstructures whose composition is identical to that of the substrate, for example a nickel alloy, to a very high temperature, oxidation-resistant material at the top of the microstructures, such as $Al_2O_3$, a NiCrAl alloy, or a NiCrAlY alloy. This smooth transition is achieved by gradually changing the concentrations of the ions in the electroplating solution.

As compared to prior thermal barrier coatings, the new design has major advantages, including the following: A typical 100 µm PSZ coating provides relatively little resistance to heat transfer, and allows a turbine gas temperature increase of several tens of degrees. By contrast, the new design allows an increase in inlet gas temperature of around 290° C. or even more. A thermal barrier coating formed from PSZ has a low strain tolerance, low bond strength, and low thermochemical stability. The density of point defects in PSZ does not allow the inward diffusion of cations or onions needed to form a protective oxide layer. Many stress-induced small cracks are typically present in a PSZ coating. Oxidation of the bond coat occurs, forming an $Al_2O_3$ layer at the interface between NiCrAlY and PSZ, leading to further differences in α at the interface and to PSZ spalling induced by thermal cycling. By contrast, the novel design does not require $ZrO_2$ or any other thermal barrier coating. Likewise, the problem of α mismatch between a continuous thermal insulating layer and the substrate no longer exists. The individual microstructures are flexible, and the microstructures as a group are discontinuous. The effect of any thermal mismatches will be negligible because of the small size of the microstructures.

An embodiment of a turbine blade in accordance with the present invention is illustrated schematically in FIGS. 1(a) and 1(b). Turbine blade 2, made of a high temperature, high strength nickel alloy (such as a high-temperature NiCo alloy) is 0.3 meters in length (R). Blade 2 and shaft 4 are assumed to rotate at 30,000 rev/min. The environment in which the blade operates is assumed to be air at a temperature of 1700° K. and a pressure of 500 kPa (~5 atmospheres). Blade 2 is cooled internally through means known in the art (not illustrated).

The surface of blade 2 is covered with microstructures 6 shape is generally as illustrated in FIG. 1(b). Each microstructure comprises a rectangular column 8 oriented normal to the blade surface and capped by a rectangular plate 10. A preferred geometry for microstructures 6 is illustrated in FIG. 2. Note that the length dimension of each column 8 is oriented parallel to the length of blade 2. The stresses in the microstructure reach a maximum at base of the microstructures that are near the tip of the blade, where centripetal forces are greatest.

With a blade length of 0.3 meter and a rotational velocity of 30,000 rpm, the acceleration at the tip of the blade is $a=2.96\times10^6$ m²/sec. The force per unit length p applied to the structure is p=phwa, where η is the density of the material (for nickel, η=8000 kg/m³), h is the height of the cantilever (assumed to be 500 µm), and w is the cantilever width (assumed to be 40 µm), giving a value of p=189N/m.

The maximum moment within the cantilever beam occurs at its base. The magnitude of the moment is $M=0.5\,pL^2$, where L is the length of the cantilever (assumed to be 500 µm). The moment at the base of the cantilever is $2.36\times10^{-5}$N-m. The moment at the base of the cantilever is used to calculate the maximum stress in the beam: $\sigma_1=Mc/I$, where $\sigma_1$ is the stress due to the distributed load of the beam, c is the distance from the neutral axis (h/2), and I is the moment of inertia ($h^3b/12$). The maximum stress due to the distributed load occurs at the base of the cantilever beam, and has a magnitude of $8.85\times10^7$N/m²(=12.8×10³psi=12.8 ksi).

A similar analysis can be used to estimate the contribution of the mass on the end of the cantilever to the total stress. In this case, the moment induced at the base of the cantilever by the mass is equal to the product of the force due to that mass (i.e., the mass multiplied by the centripetal acceleration) and the length of the cantilever beam. The stress induced by the "weight" at the end of the beam is $\Sigma_2=Mc/I$. The magnitude of this second stress component is 4.3 ksi. The sum of the two components gives the maximum stress in the microstructure, approximately 17.1 ksi. This maximum stress is low enough to conclude that creep-induced deformation should not be a significant problem over reasonable operational time spans. Similarly, the maximum deflection of the end of the cantilever beam is low, and can be calculated by superposition to be less than 1.0 micron.

Figure 3B:
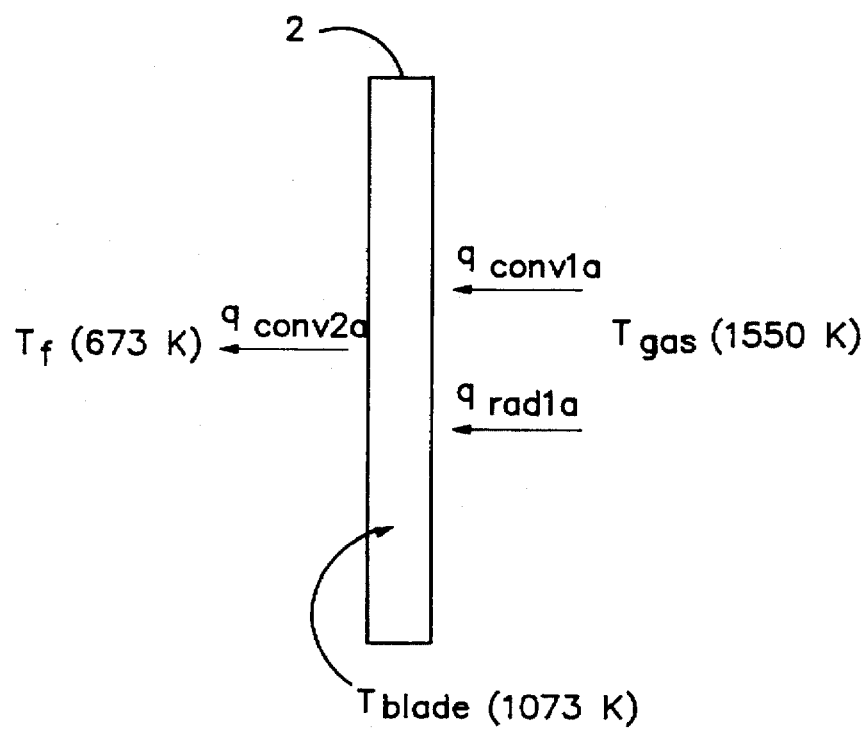

The thermal resistance added by covering the blade with a microstructure canopy is substantial. FIGS. 3(a) and 3(b) illustrate heat flow with and without the microstructure canopy, respectively. In both cases, the heat flux from the surroundings to the blade is removed by internal cooling passages (not illustrated). In both cases, the blade temperature is assumed to be maintained at 800° C.=1073° K. The dependent (or limiting) variable in the case without microstructures is the heat transfer coefficient to the internal cooling medium. In the case with microstructures, the dependent (or limiting) variable is the allowable temperature of the turbine gas.

Analysis without microstructure canopy. Heat transfer between the blade and the surroundings occurs both by convection and by radiation ($q_{conv1a}$ and $q_{rad1a}$). The blade is maintained at 1073° K. (800° C.) by convective heat transfer ($q_{conv2a}$) to a fluid at 673° K. (400° C.). Convective heat transfer from the surrounding medium to the blade is $q=h\Delta T$, where q is the heat flux, h is the convective heat transfer coefficient, and $\Delta T$ is the temperature difference between the plate and the freestream of the fluid.

The value of the convective heat transfer coefficient, h, may be approximated as $$h_{conv1a} = (K/L)(0.037\ (V_\infty L/v)^{0.8} - 871)(Pr)^{1/3}$$

where K is the thermal conductivity of air (0.0891 W/m-K), L is the length of the plate (assumed to be 0.05 m), $V_\infty$ is the freestream velocity (assumed to be 942 m/sec), v is the dynamic viscosity of the fluid (assumed to be $40 \times 10^{-6}$ m$^2$/sec), and Pr is the Prandtl number of the fluid (assumed to be 0.705). The fluid properties used are those of air at 1400° K. (the film temperature) and 500 kPa. The freestream velocity is the tip speed of the blade, and the length L is the blade width. With these assumptions the value of $h_{con1a}$ is 2836 W/m$^2$-°K.=0.2836 W/cm$^2$-°K., and the heat flux to the plate from the surrounding air by convective heat transfer, $q_{conv1a}$, is $1.35 \times 10^6$ W/m$^2$, or 135 W/cm$^2$.

Assuming that both the blade and the gas act as blackbody emitters, radiative heat transfer to the blade is $$g_{rad1a} = \sigma(T_{gas}^4 - T_{blade}^4)$$

where $\Sigma$ is the Stephan-Boltzmann Constant ($5.88 \times 10^{-12}$ W/cm$^2$-°K.). The radiative heat flux to the blade is thus 25 W/cm$^2$, and the total heat flux across the blade ($q_{total} = q_{conv1a} + q_{rad1a}$) is 160 W/cm$^2$. This heat is removed by fluid forced through internal ducts within the blade. The magnitude of the heat transfer coefficient, $h_{conv2a}$, is given by $h_{conv2a} = q_{total}/(T_{blade} - T_{gas})$. The calculated magnitude of $h_{conv2a}$ is then 0.40 W/cm$^2$-°K.

Analysis with microstructure canopy. In this analysis the temperature of the blade is held at 1073° K. as before, and the parameters associated with internal cooling are assumed to be the same. With the same parameters, it follows that the heat flux across the blade is the same as calculated in the previous section (160 W/cm$^2$). This heat flux value then allows calculation of the maximum allowable turbine gas temperature and the corresponding shield temperature for the case where microstructures are present. The maximum allowable temperature of the gas and the shield is estimated by assuming radiative heat transfer to be linear, and by evaluating the relative magnitudes of the linear thermal resistances between the temperatures of interest ($T_{gas}$, $T_{shield}$, and $T_{blade}$). The following two additional assumptions are also made: (1) All emissivities have a value of 1.0. (2) The array of microstructures forms a radiation shield. Heat transfer between the shield and the blade occurs by conductive and radiative heat transfer only. Radiative heat transfer is calculated based on the area of the surface not occupied by the support structures (the rectangular posts in the embodiment of FIGS. 1 and 2). Conductive heat transfer is calculated based on the percentage of the total cross sectional area occupied by the support structure. The velocity of the gas in the space between the shield and the blade is minimal, and convective heat transfer may therefore be disregarded.

Heat transfer between the shield and the blade surface is the sum of the conductive and radiative heat transfer components:

$$q_{cond1b} = (A_m/A_t)(K_m/L)(T_{shield} - T_{blade})$$

$$q_{rad2b} = h_{rad2b}(1 - A_m/A_t)(T_{shield} - T_{blade})$$

$$h_{rad2b} = 4\sigma T_{m2}^3$$

where $T_{m2} = (T_{shield} + T_{blade})/2$; $A_m$=area of microstructure support (approximately 10% of total); $A_t$=total area of shield; $K_m$ is the thermal conductivity of the support structure (0.20 W/cm-°K.); and L is the height of the microstructures ($500 \times 10^{-4}$ cm). Knowing the total heat flux between the shield and the blade (160 W/cm$^2$) and the blade temperature (1073° K.), the temperature of the shield may be found, by iterating the following equations, to be 1440° K.

$$q_{cond1b} + q_{rad2b} = (T_{shield} - T_{blade})/R_2 = 160\ W/cm^2$$

$$1/R_2 = (1 - A_m/A)h_{rad2b} + (A_m/A_t)(K_m/L)$$

The heat transfer between the gas and the shield is the sum of convective and radiative heat transfer. The following equations give these two components, and the linearized radiative heat transfer coefficient:

$$q_{conv1b} = h_{conv1b}(T_{gas} - T_{shield})$$

$$q_{rad1b} = h_{rad1b}(T_{gas} - T_{shield})$$

$$h_{rad1b} = 4\sigma T_{m1}^3$$

where $$T_{m1} = (T_{gas} + T_{shield})/2$$

Knowing the value of the total heat flux between the gas and the shield (160 W/cm$^2$) and the shield temperature (1440° K.), the maximum allowable gas temperature is calculated iteratively using the equations below, and found to have a value of 1850° K. The convective heat transfer coefficient, $h_{conv1b}$, is equal to the value calculated above for the zone between the air and the blade.

$$q_{conv1b} + q_{rad1b} = (T_{gas} - T_{shield})/R_1$$

$$R_1 = 1/(h_{rad1b} + h_{conv1b})$$

The addition of the microstructure shield allows a remarkable 290° K. increase in the turbine gas temperature with the same blade temperature.

A similar analysis shows that for a given inlet turbine gas temperature, the blade temperature will decrease 150°–175° K. with the microstructure canopy. The novel microstructure thermal barrier coating has tremendous potential.

Figure 4A:
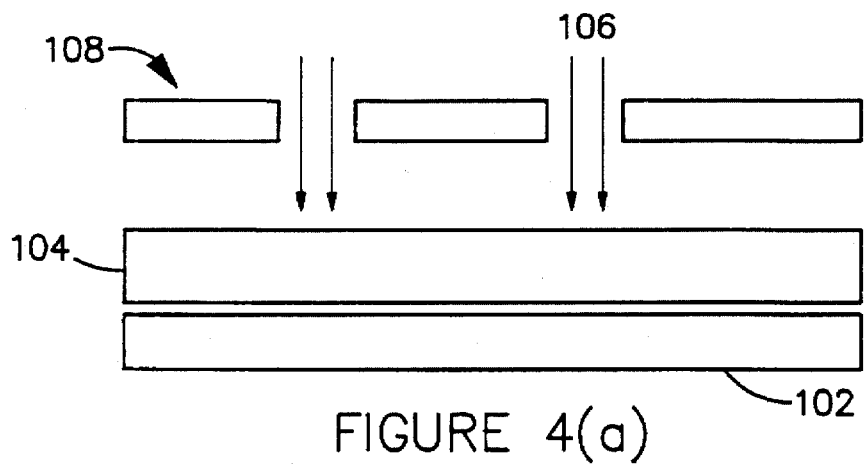
FIGS. 4(a) through 4(d) schematically illustrate the LIGA process.
Figure 4B:
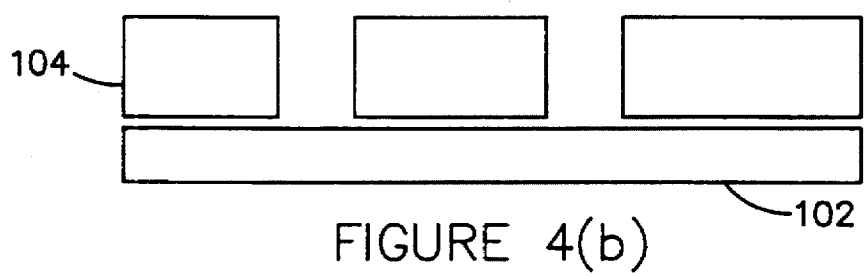
Figure 4C:
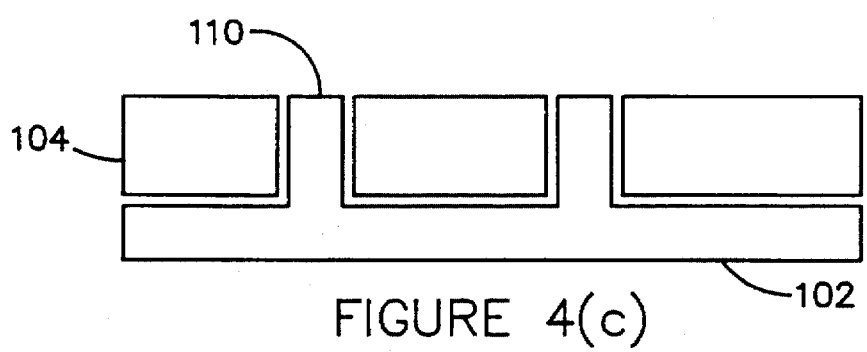
Figure 4D:
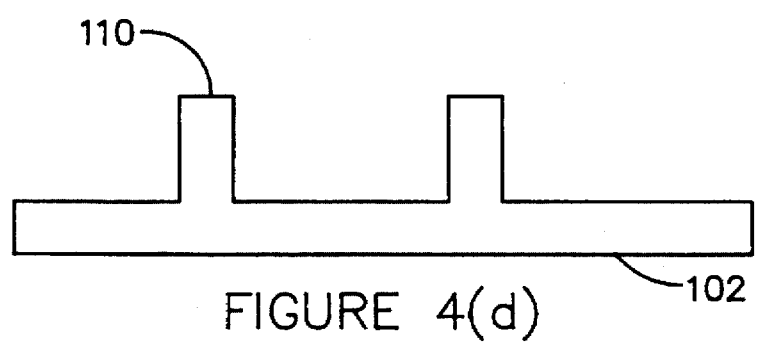

Manufacture of Microstructure-Covered Blades. The manufacturing techniques described here for thermal barriers may be applied generally to other microstructure-covered surfaces as well, such as those used in augmenting heat transfer, in composite materials, and in acoustic barriers (although the use of heat-resistant materials may not be necessary in all applications). Thin sheets of polymer film will be used to manufacture large fields of high aspect ratio microstructures ("HARM's"). A "HARM" is a structure having a height of hundreds of microns and a width of a few microns or a few tens of microns. These HARM-covered films will be manufactured using the LIGA process, which combines deep-etch X-ray lithography, electrodeposition, and polymer molding. The LIGA process is illustrated schematically in FIGS. 4(a) through 4(d). As illustrated in FIG. 4(a), an electrically conductive substrate 102 is coated with a layer of a photoresist 104 such as polymethyl methacrylate ("PMMA") tens or hundreds of microns thick. The layer of resist is exposed to x-rays 106 through mask 108. Where mask 108 allows radiation 106 to pass, resist 104 degrades and becomes soluble in a developer. After development (FIG. 4(b)) the regions on substrate 102 that are no longer covered with resist 104 serve as initiation sites to electroform metal microstructures 110 (FIG. 4(c)). Following electroforming, removal of the remaining resist 104 produces a substrate covered with free-standing structures (FIG. 4(d)), which may then be used as a mold insert in forming a polymeric microstructure (not illustrated).

Exposing a large area of resist in a single exposure (on the order of 10 cm×10 cm) is more efficient than exposing an equal area in a series of exposures of smaller areas, because the rate of production during molding is proportional to the size of the mold. Larger mold inserts are more easily manufactured from larger regions of patterned resist. To expose such large areas of resist, the resist typically must be moved relative to the x-ray beamline. Two approaches may be used to expose large areas of resist. If the area of the mask pattern is small relative to the area of resist to be exposed, then the resist is moved with respect to the mask (or vice versa) through a series of accurately calibrated "steps" through means known in the art. On the other hand, if the area of the pattern on the mask is the same as the area of resist to be exposed, then the mask and resist can be moved in tandem relative to the beamline.

Several methods may be used to reproduce HARM's efficiently from template or mold inserts. The advantages gained by exposing a large area of resist can be significant. However, where fields of microstructures must cover areas on the order of hundreds of $cm^2$ or even $m^2$, it is impractical to manufacture the material using only a lithography electroplating process. In such cases, it is far more practical to repeatedly reproduce a relatively small pattern from a mold insert.

In the LIGA process for creating microstructures, mold inserts are produced by overplating the microstructures during the electrodeposition step. The mold insert is then used in a polymer molding process to fabricate polymer parts that represent either final products themselves, or that serve as disposable mold inserts in a subsequent electroplating process to manufacture metal HARM's. In addition to providing a technique to rapidly produce HARM's, LIGA makes possible manufacture of microstructures using a variety of materials other than polymers, for example ceramics.

This microstructure-covered substrate does not usually represent the final product, but instead serves as a mold insert. The mold insert is used in a polymer molding process to fabricate polymer sheets containing voids where the structures were present in the insert, and vice versa. The polymer sheets are then bonded to a conductive surface (e.g., a turbine blade), and microstructures are electroplated in the voids in the polymer film. The polymer is then removed after the electroplating process is completed, e.g., by dissolution in solvent.

Figure 5A:
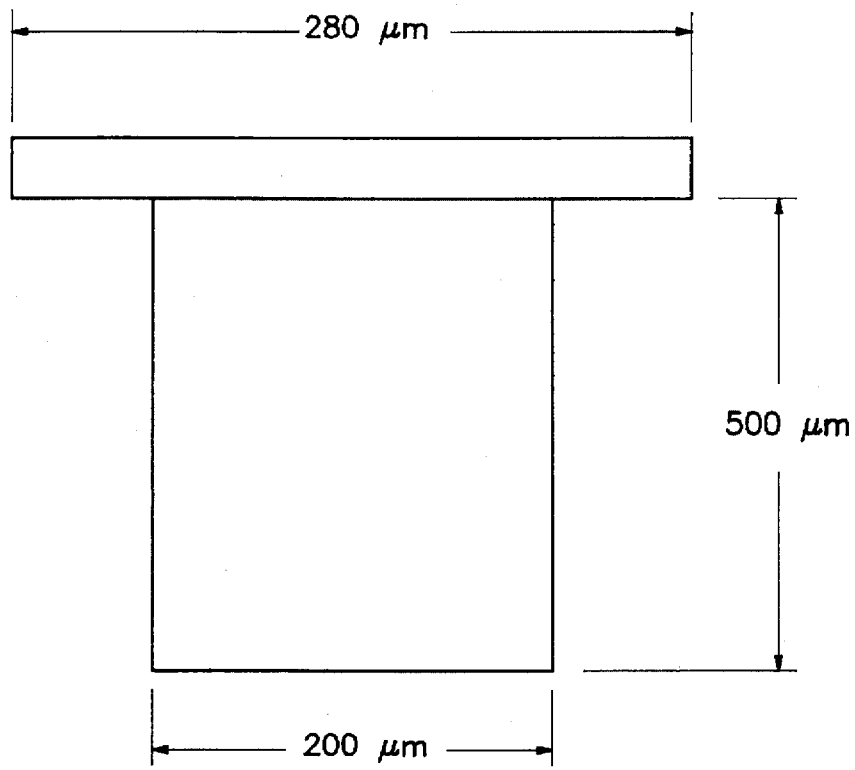
FIGS. 5(a) and 5(b) illustrate cross sections of microstructures used in a thermal barrier in accordance with the present invention.
Figure 5B:
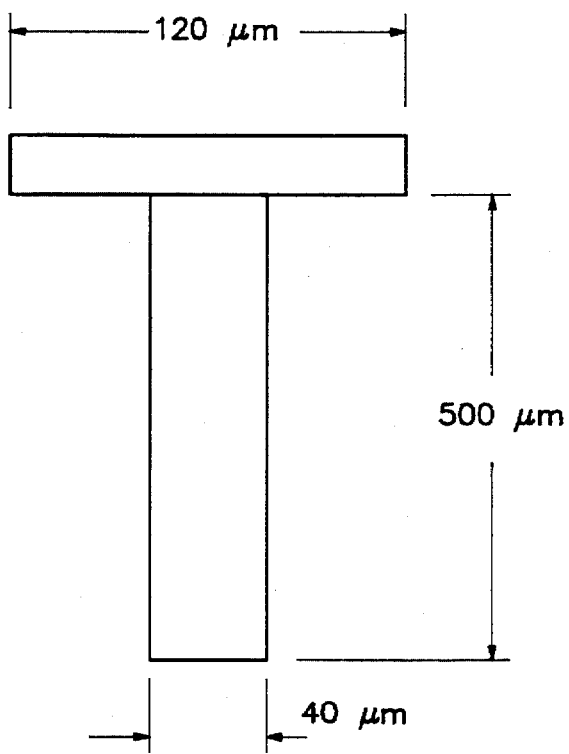

For example, polymer sheets containing fields of microstructures having the cross sections in perpendicular directions shown in FIGS. 5(a) and 5(b) will be produced. A ten μm gap between adjacent canopies in all directions will allow more than ample room for thermal expansion. The PMMA sheets will be glued onto a turbine blade with the monomer methyl methacrylate. The monomer may extrude through the holes of the polymer sheet, but can easily be removed with a solvent (e.g., the same solvent used as the developer). Once the sheet is attached to the blade, and the holes are cleared of monomer, the blades are dipped into an electrolytic bath and structures of selected composition are grown.

Materials Aspects. Proper materials selection is necessary to optimize the performance and integrity of the new thermal barrier shield at service temperatures. Qualitatively, the materials requirements for the blade may be less demanding, because the temperature of the blade can be substantially lower than would otherwise be the case, all else being equal.

The materials requirements of the microstructure tips are more demanding, in that they must be able to sustain temperatures of 1200°–1300° K.; on the other hand the stress carried by the tips is relatively low. Moderate degradation of mechanical properties at the high-temperature end (the shield plate) can be tolerated, because the magnitude of stress at that end of the plate is low. Higher stress at the interface with the blade may also be tolerated because the temperatures at that end are lower.

Ni superalloys are good high-temperature materials. To protect the blade, Ni—Cr based alloy posts, which can for example be prepared by electroplating techniques known in the art, will be built on the blade surface. It is preferred to create a Cr concentration gradient in the microstructures, such that near the interface with the blade surface the deposit is Ni-rich, while the shield plate is Cr-rich. The posts can then be oxidized, producing a $Cr_2O_3$ shield. ($Cr_2O_3$ is known to be one of the best thermal protective barriers. Other thermal protective barrier compositions include $Al_2O_3$ and $SiO_2$.) Composition variation during electroplating is performed through means known in the art by appropriate control of parameters such as ion concentration, current density, pH, and deposition potential. Such a "functionally gradient material" will have improved mechanical, adhesion, and oxidation resistance properties. A high Cr content at the shield plate will form a continuous chromina coating as a barrier against oxidative degradation. The Ni-rich end resembles the substrate to minimize thermal mismatch and adhesion problem.

Above 1273° K., $Cr_2O_3$ may be oxidized to $CrO_3$, which is a volatile compound. However, the higher end of the projected service temperature range is above 1273° K. A Ni—Cr alloy may therefore not suffice in all applications. Alternative alloys for use at higher temperatures include electroformed Ni—Al binary alloy, Ni—Cr—Al ternary alloy, and Ni—Cr—Al—Y alloy. These coatings rely on a continuous $Al_2O_3$ scale for oxidation resistance. Such a scale is known to form on nickel aluminides, NiCrAlY, and CoCrAl coatings. The scale is an effective oxidation barrier over the temperature range 1100° K. to 1400° K. $Ni_xAl_{1-x}$ and Al—Cr may be co-deposited from non-aqueous baths. See, e.g., T. Moffat, J. Electrothem. Soc., vol. 141, pp. 3059 ff (1994). Co-electrodeposition of Y with the transition metals will be performed with methods analogous to those used in S. Powers et al., Materials Chem. & Phys., vol. 35, pp 86 ff. (1993). Another alternative is to deposit individual layers of elemental metals separately, then to complete the alloying reactions by diffusion at elevated temperature.

Prototype Manufactures

A nickel film on a silicon wafer served as the metallization layer for electrodeposition on prototype HARM-covered structures. In one prototype, closely-spaced box-shaped microstructures 500 μm tall and 45 μm wide were manufactured, and the tops were then overplated. In another prototype, "mushroom" shaped canopies were manufactured 20 μm tall, 5 μm diameter, topped by hemispherical canopies 30 to 50 μm in diameter at the base.

A 0.1 μm-thick nickel film, deposited from a modified Watts bath, adhered well to a silicon wafer. The composition of the modified Watts bath was as follows: $NiSO_4 \cdot 6H_2O$ (300 grams/liter), $NiCl_2 \cdot 6H_2O$ (45 grams/liter), boric acid (45 grams/liter), sodium lauryl sulfate (0.3–0.5 grams/liter), saccharin (0.5–1.0 grams/liter), coumarin (0.5 grams/liter), pH 2.0, temperature 55° C. The sodium lauryl sulfate acted as a surfactant, and the saccharin acted as a stress reliever to help produce fine grains. The anode was a nickel foil. High current densities of 0.1 to 0.2 $A/cm^2$, corresponding to a nickel deposition rate of 100–150 gm/hour, lowered the time required to electroplate the 490 μm tall nickel prototype structures to just four hours. Profilometric measurements of the heights of the structures indicated no more than a three μm variation in height across any one structure, and a variation not exceeding ten μm between any two structures, an acceptable range of variation. This modified Watts bath has two important advantages over the standard Watts bath in manufacturing mold inserts. First, high current densities can readily be achieved, on the order of 200 mA/cm$^2$, allowing the deposition of tall structures to be completed in a few hours. Conventional nickel plating procedures would require many hours or even days to electroplate such high structures. PMMA is hydrophilic and swells gradually in the presence of water. Stresses generated as PMMA swells in aqueous electrolytic baths could cause PMMA to delaminate from the substrate. Shorter electroplating runs help minimize this problem. A second advantage of the modified Watts bath is that a fine-grained deposit without significant impurities was produced; the grain size was often on the order of nanometers. Such fine-grained deposits have improved hardness. Measurements using a microhardness indenter (15 gram load) showed that the resulting mold insert had a Vickers hardness number (VHN) of 494, a value almost twice as high as that for nickel prepared using conventional electroplating procedures. The exceptional hardness of the deposited nickel produced a mold insert with the desired high rigidity and low wear rate.

It is important to maintain a strong bond between the resist and the substrate. If this bond separates or breaks, electroplating can then occur underneath the resist structures, and the mold insert quality will be poor. In work performed to date, commercially-obtained sheets of PMMA have been bonded to nickel-coated silicon wafers. In most cases, adhesion of the layer to the wafer was excellent throughout the entire process sequence, although for unknown reasons adhesion was poor in a few cases. Tests have demonstrated that rapidly cooling the PMMA-substrate laminate from 50° C. to room temperature can produce thermal stresses high enough to cause PMMA to delaminate from the substrate. It is possible that thermal cycling of comparable magnitude is generated during the exposure process itself. Another possible cause for delamination is that PMMA swells during exposure to x-rays. This swelling may produce stresses that can lead to delamination. Also, as previously discussed, stresses induced by the swelling of PMMA in the electrolyte during the plating process can cause delamination. The electrodeposition rate in larger cavities can be greater than the rate in smaller cavities in structures whose cross sectional area varies considerably. Such differential deposition rates should not present major difficulties if the characteristic dimension of the structure being electroplated does not vary by more than about one order of magnitude across the structure; or if the "height" of the "wells" in the resist in which electrodeposition occurs is made taller than the "height" of the structures being formed; or if, after electrodeposition, the surfaces of the microstructures are lathed to a common height.

Test facilities

Figure 6:
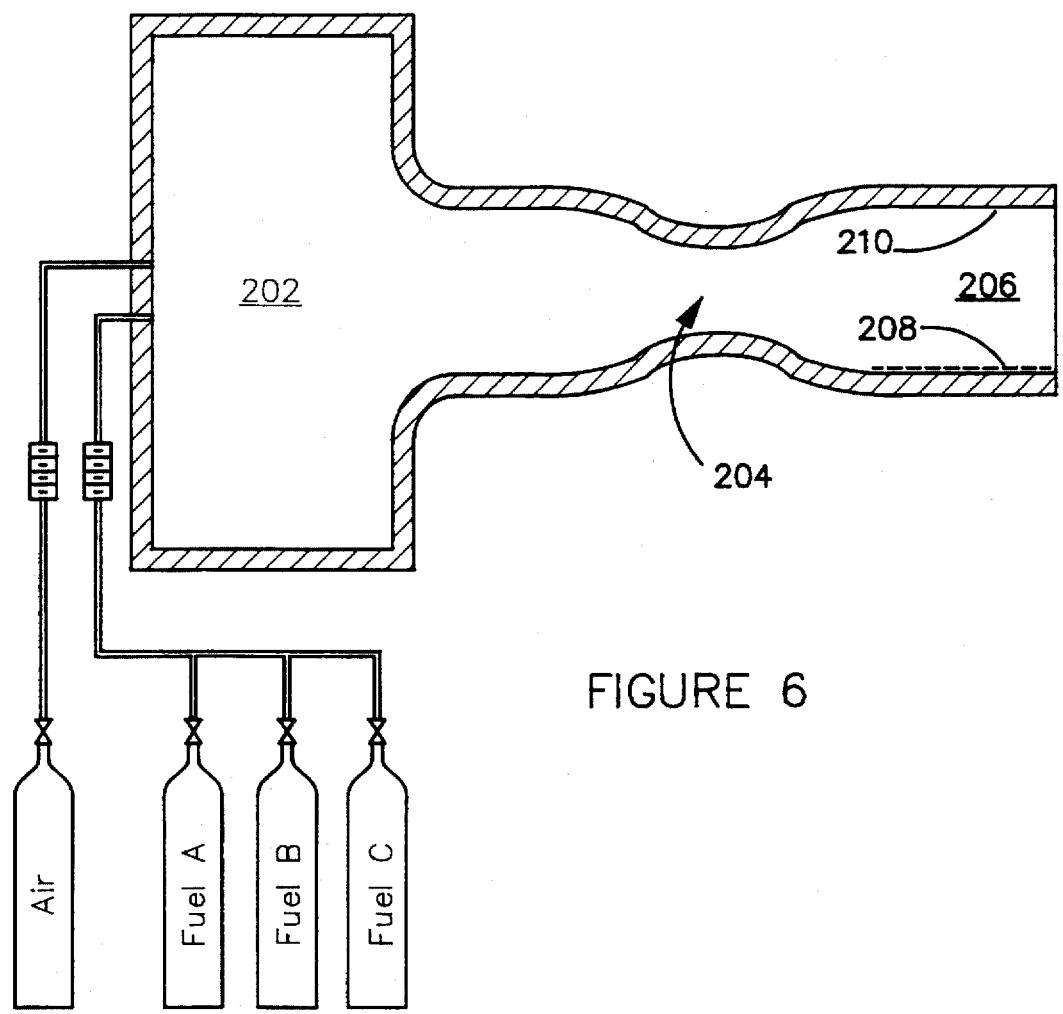
FIG. 6 illustrates a test facility for evaluating thermal barriers in accordance with the present invention.

The effectiveness of microstructure thermal barriers may be evaluated in test facilities such as that illustrated in FIG. 6. This facility, which produces a high-velocity, high-temperature gas stream, comprises three primary components: combustion chamber 202, two-dimensional converging-diverging laval nozzle 204, and test section 206. The combustion chamber produces a high-pressure, high-temperature gas through the combustion of a fuel such as methane with an oxidizer. Hot gas leaves combustion chamber 202, and is accelerated to high speeds through laval nozzle 204. The high-velocity, high-temperature gas then passes through test section 206, where the heat transfer characteristics of a microstructure barrier can be evaluated. The design of FIG. 6 is similar to those that have been previously used to create heated jet flows. See R. Kantola, "Acoustic Properties of Heated Jets," J. Sound & Vibration, vol. 26, no. 8 (1988). By altering the fuel composition and the fuel-to-oxidizer ratio, the temperature of the gas stream can be varied from approximately 800° K. to approximately 2000° K. The fuel and oxidizer are provided from bottled gas supplies, with their flow rates controlled by regulators and monitored by gas flow meters. Additionally, by using a set of interchangeable converging and laval nozzles, a range of subsonic and supersonic gas velocities can be achieved within the test section. Hence, the test facility shown in FIG. 6 allows the effectiveness of the microstructure barrier to be measured over a broad range of simulated turbine blade flow conditions.

Figure 7:
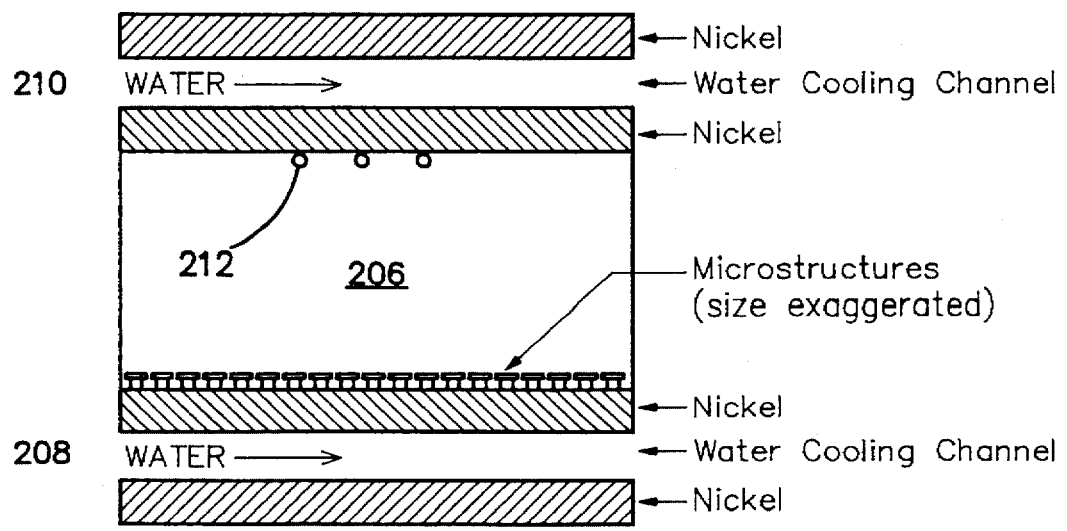
FIG. 7 illustrates a schematic enlargement of a portion of the walls of the test facility illustrated in FIG. 6.

Cylindrical combustion chamber 202 is 8 cm in diameter and 10 cm long. Rectangular test section 206 is approximately 4 cm×4 cm×6 cm in height, width, and length, respectively. Two opposing sidewalls of test section 208 and 210 are removable, and are designed to simulate a typical turbine blade. As shown in FIG. 7, which is an enlargement of test section 206, removable sidewall 208 is covered with microstructures, while opposite sidewall 210 is not. In this way, the heat transfer characteristics of microstructure-coated wall 208 are compared to those of uncoated wall 210 under identical operating conditions.

Several high-temperature thermocouples 212 (type K) are installed in both sidewalls to monitor the "blade" surface temperatures, the cooling water inlet and outlet temperatures, and the heat flux to the "blade" surfaces. Thermocouple measurements on the coated and uncoated walls allow the direct evaluation of the blade surface temperature reduction produced by the microstructures. In addition, by simultaneously recording the wall temperatures, the cooling water temperature, and the gas flow temperature, heat flux to the blades can be determined.

Although the heat transfer barriers have been described with particular reference to their use in turbine blades, they will be effective in other applications where it is desirable to reduce heat transfer. The objects being insulated will generally have a surface area of at least about 10 cm$^2$, and the number of microstructures used is preferably at least about 10 per cm$^2$ of surface area, more preferably at least about 500 per cm$^2$. The distance from the heat shield to the surface is preferably between about 0.1 mm and about 2.0 mm, more preferably between about 0.5 mm and about 1.5 mm, most preferably about 1.0 mm.

Enhancement of heat transfer

In another application of HARM's, rates of heat transfer can be augmented by covering a surface with a field of "microposts" to radiate heat instead of "micro-umbrellas" to block heat transfer. For example, using a field of microposts in the cooling passages of a turbine blade could help better cool the blade. Enhanced internal cooling with microposts may be used in lieu of, or preferably in addition to the microstructure canopy on the outside of the blade. The objects whose heat is being transferred away will generally have a surface area of at least about 1 cm$^2$, and the number of microposts used is preferably at least about 10 per cm$^2$ of surface area, more preferably at least about 5000 per cm$^2$. The preferred aspect ratio of each micropost depends on its composition, as well as the identity of the surrounding fluid, but is generally at least about 10. In this context, the "aspect ratio" of a micropost is the ratio of the distance between the proximal and distal ends of the micropost to the characteristic dimension of the micropost; where the characteristic dimension of a micropost is the diameter of the micropost in a plane perpendicular to a line between the proximal and distal ends of the micropost. Each of at least about 80% of the microposts is farther from the nearest neighboring micropost than a distance of about 20 times the characteristic dimension of the micropost.

An example is an article of manufacture comprising a heat sink to augment heat transfer between an object and the surroundings, wherein: (a) the object has a face whose surface area is at least about 1 cm$^2$; (b) said heat sink comprises a plurality of at least about 1000 microposts per cm$^2$ of surface area of the face, wherein each of said microposts has a distal end and a proximal end; (c) said proximal end of each of said microposts is connected to the face; (d) said distal end of each of said microposts is not connected to a shield, wall, or other object that inhibits heat transfer; and (e) the distance between the proximal and distal ends of each of said microposts is between about 0.05 mm and about 1.0 mm, and the aspect ratio of each of said microposts is at least about 5; whereby total heat transfer between the object and the surroundings is substantially greater than would be the heat transfer between an otherwise identical object lacking said microposts and the surroundings.

Preferably: (a) said heat sink comprises a plurality of at least about 10,000 microstructures per cm$^2$ of surface area of the face; (b) the distance between the proximal and distal ends of each of said microposts is at least about 0.1 mm; and (c) each said micropost is farther from the nearest neighboring micropost than a distance of about 5 times the diameter of said micropost.

For example, consider an otherwise flat surface covered with nickel posts 20 μm in diameter and 800 μm long, with an air freestream velocity over the surface of 10 m/sec.

If the plate is flat, the heat transfer coefficient h is given by $$h=0.037 \ K/L \ (V_\infty L/v)^{0.8} Pr^{0.333}$$

Assuming that the fluid has the properties of air at room temperature, that the temperature of the plate is constant, $T_0$, and that the length of the plate is 1.0 m, then h=38 W/m$^2$-°K. The rate of heat transfer per unit area, q, is given by $$q=(38 \ W/m^2 \text{-}°K.)(T_0-T_\infty)$$

where $T_\infty$ is the freestream temperature.

Calculation of heat transfer from the sheet covered with posts makes the reasonable approximation that the sheet, including the base of all the posts, has a uniform temperature, $T_0$. With this boundary condition, the heat flux through each post is given by:

$$q=(hPk/A)^{0.5}(T_0-T_\infty)$$

where:
h=convection heat transfer coefficient around a post
P=perimeter of post (πD)
A=cross section of post (πD$^2$/4)
k=thermal conductivity of post
The value of h is given by:

$$h=0.911 \ K/D \ (V_\infty D/v)^{0.385} Pr^{0.333}$$

where:

$V_\infty$=freestream velocity
D=post diameter
V=dynamic viscosity of air at 300° K.
Pr=Prandtl number of air at 300° K.
K=thermal conductivity of air at 300° K.

Using published values for these properties of air, the value of h is calculated as 2820 W/m$^2$-°K. Note that this value is two orders of magnitude higher than the convective heat transfer coefficient for the flat plate without microstructures.

The heat transfer flux through each post, assuming the thermal conductivity of the nickel post is 50 W/m-°K., is given by:

$$q=(168,000 \ W/m^2 \text{-}°K.)(T_0-T_\infty)$$

Note that the heat transfer of a micropost is over four thousand times greater than the heat transfer of an area of flat sheet having the same size as the cross-section of the base of the post.

The overall heat transfer from a surface with microposts covering 2% of the surface area of the plate is the weighted average of the heat transfer rate from the 2% covered with posts and the 98% not covered with posts. Assuming that convective heat transfer between the area not covered with posts and the air is not substantially altered by the presence of the posts, the effective heat transfer coefficient between the surface and the air is (0.02)(168,000)+(0.98)(38)=3397 W/m$^2$-°K., an increase of almost two orders of magnitude compared to a flat plate of the same size. This calculated ratio is probably too high, because internal resistances in the plate will limit heat transfer through each post, but it is nevertheless true that HARM posts dramatically decrease thermal resistance between a surface and the surrounding medium. In cases where the convective heat transfer coefficient between a surface and the surrounding medium is a large contributor to the total resistance to heat transfer, adding HARM's to the surface can increase heat transfer dramatically.

Composite Materials

In yet another application, HARM's can be used to join layers of dissimilar materials to form a composite material. HARM's can be used to bind materials together strongly that would otherwise bond weakly or not at all, allowing the production of novel composite materials. Weakness at the interface between different lamina in a laminated composite is often the limiting factor in controlling the properties of the laminate. Strong bonds between the lamina are usually desired. With prior technologies it has often been difficult to establish strong bonds between otherwise potentially useful material combinations. For example, metal-polymer and metal-ceramic bonds are often weak. However, by covering a metal sheet with HARM's, the metal sheet can be strongly joined to thin sheets of polymer or ceramic. The resulting product can be very useful, combining for example the strength and toughness of a metal with the light weight of a polymer, or the high temperature properties of many ceramics. Lamina that may otherwise bond poorly to one another can be joined more strongly with HARM's at the interface between lamina, to better physically link the lamina to one another, and to enhance chemical bonding between the layers by increasing the surface area of interaction.

Applying HARM's to the surface of one of the materials limits the degrees of freedom in which failure of the bond is likely to occur, and also greatly increases the surface area of the interface at which the two materials are joined. Thus binding may be enhanced both by mechanical linkage of the two surfaces, and by enhanced chemical bonding through increased areas of interaction.

Where HARM's are not present at the interface, the stress (normal or shear) required to separate the two sheets is the "conventional" strength (tensile or shear) of the interface. But with fields of HARM's, failure due to an applied shear stress cannot occur without shearing off the HARM's themselves; furthermore, the normal stress at which failure occurs is higher because a load-carrying component at the interface has been added, the load carried in shear along the interface with the HARM's.

This concept may be extended to physically interlocking surfaces in which one of the surfaces is covered with HARM's. Failure due to mechanical forces then cannot occur in any direction without shearing the HARM's, regardless of the strength of any interactions between the surfaces.

An example is a composite material comprising a first layer of a first substance, and a second layer of a second substance that is different from the first substance, wherein: (a) each of said layers comprises a proximal face, and the proximal faces of said first and second layers are substantially in contact with one another; (b) said proximal face of said first layer is connected to the proximal ends of each of a plurality of at least about 10 microstructures per cm$^2$ of surface area of the proximal face of said first layer, wherein each of said microstructures comprises a proximal end and a distal end; (c) the distance between the proximal and distal ends of each of said microstructures is between about 0.01 mm and about 0.5 mm, and the aspect ratio of each of said microstructures is at least about 5; and (d) the shape of said proximal face of said second layer is substantially complementary to said microstructures; whereby the adhesion between said first and second layers is substantially greater than would be the adhesion between two otherwise identical layers lacking said microstructures.

Preferably: (a) said proximal face of said first layer is connected to the proximal ends of each of a plurality of at least about 100 microstructures per cm$^2$ of surface area of the proximal face of said first layer; (b) the distance between the proximal and distal ends of each of said microstructures is between about 0.1 mm and about 0.5 mm, and the aspect ratio of each of said microstructures is at least about 10; and (c) each of said microstructures is closer to the nearest neighboring microstructure than a distance of about 5 times the width of said microstructure.

Acoustic absorbers

Yet another application of HARM's is as acoustic absorbers, to reduce the amplitude of sound transmitted through a surface. Sound waves impinging on one side of a surface cause the surface to vibrate; the vibrating surface then transmits sound energy to its surroundings on the opposite side; air is usually the medium of interest. The human ear can detect sound in an audible range from about 20 to about 15,000 Hertz. At a given frequency, the amplitude of sound increases with the amplitude of the vibration of the surface. Covering the surface with appropriate microstructures can reduce the amplitude of transmitted vibrations, and can therefore reduce the amplitude of the sound transmitted to the surrounding medium. The natural frequency of the microstructures is a function of their geometry and composition. The geometry and composition are chosen so that the natural frequency is below that of the vibrations of interest. They will thus oscillate out of phase with those vibrations, and the amplitude of the vibrations at the tips of the microstructures will therefore be less than the amplitude of the vibrations of the underlying surface. Because the amplitude of displacement of the tips of the microstructures is small, the sound transmitted across the surface is greatly reduced, because it is primarily at those tips where sound energy is transmitted to the adjacent air.

Consider, for example, two flat sheets, one without a layer of HARM's and one with a layer of HARM's to be described below. In both cases a forcing function on one side causes the sheets to vibrate at 5000 Hz. The sheet without microstructures will transmit sound of frequency 5000 Hz to the surrounding air at a particular amplitude.

The microstructures covering the other sheet, however, have a natural frequency below 5000 Hz, and will therefore absorb much of the 5000 Hz energy. For example, a nickel cantilever microstructure with a natural frequency of 2400 Hz may be made with a cylindrical "post" capped with a cylindrical "weight," the two cylinders having collinear axes. The post is 500 µm tall and 15 µm in diameter, and the weight is 200 µm tall and 200 µm in diameter. The oscillations of the microstructures with a 2400 Hz natural frequency are out of phase with the 5000 Hz oscillations of the sheet, and will transmit less than 30% of the 5000 Hz sound energy impinging on the sheet. The remaining energy is dissipated as heat.

The axes of the cylinders are preferably at an angle to a direction normal to the surface of the sheet, better permitting them to absorb vibrations normal to the surface. (Such "tilted" microstructures may readily be made by adjusting the angle of incidence of x-rays during exposure of the photoresist.) Nearest-neighbor microstructures are preferably spaced within about 2 diameters of one another (2 diameters of the larger "weights," that is, e.g., within 400 µm of one another in the above example.)

An example is an article of manufacture comprising an acoustic barrier to reduce transmission of sound having a frequency above a characteristic frequency through an object, wherein: (a) the object has a first face whose surface area is at least about 10 cm$^2$; (b) said acoustic barrier comprises a plurality of at least about 50 microstructures per cm$^2$ of surface area of the first face, wherein said microstructures are connected to the first face; (c) each of said microstructures has a natural vibrational frequency below the characteristic frequency; whereby transmission of sound above the characteristic frequency through the object is substantially less than would be the transmission of sound through an otherwise identical object lacking said acoustic barrier. Preferably, said acoustic barrier comprises a plurality of at least about 500 microstructures per cm$^2$ of surface area of the first face.

Miscellaneous

Methods of fabricating microstructures having a high aspect ratio are disclosed in Y. Vladimirsky et al., "Microstructures and Methods for Manufacturing Microstructures," international patent application publication number WO 96/07954, international publication date 14 Mar. 1996, the entire disclosure of which is incorporated by reference. The entire disclosures of all references cited in this specification are hereby incorporated by reference in their entirety. In the event of an otherwise irresolvable conflict, however, the present specification shall control.

I claim:

1. An article of manufacture comprising a heat barrier to reduce heat transfer between an object and the surroundings, wherein:

(a) the object has a first face whose surface area is at least about 10 cm$^2$;

(b) said heat barrier comprises a plurality of at least about 10 microstructures per cm$^2$ of surface area of the first face;

(c) each of said microstructures comprises a shield and a post, wherein each of said shields comprises a distal face and a proximal face, and wherein each of said posts comprises a distal end and a proximal end;

(d) said distal end of said post of each of said microstructures is connected to said proximal face of said shield of said microstructure;

(e) said proximal end of said post of each of said microstructures is connected to the first face of the object;

(f) the surface area of the distal face of each of said shields is at least about 0.001 mm$^2$; and (g) the distance between the proximal face of each of said shields and the first face of the object is between about 0.01 mm and about 2.0 mm;

whereby total heat transfer between the object and the surroundings is substantially less than would be the heat transfer between an otherwise identical object lacking said heat barrier and the surroundings.

2. An article of manufacture as recited in claim 1, wherein:

(a) said heat barrier comprises a plurality of at least about 5000 microstructures per cm$^2$ of surface area of the first face;

(b) the surface area of the distal face of each of said shields is at least about 0.01 mm$^2$; and (c) the distance between the proximal face of each of said shields and the first face of the object is between about 0.1 mm and about 1.0 mm.

3. An article of manufacture as recited in claim 1, wherein the object comprises a turbine blade.

4. An article of manufacture as recited in claim 3, wherein said turbine blade comprises a nickel alloy; and wherein each of said shields comprises a composition selected from the group consisting of Al$_2$O$_3$, Cr$_2$O$_3$, a Ni—Al binary alloy, a Ni—Cr—Al ternary alloy, and a Ni—Cr—Al—Y quaternary alloy.

5. An article of manufacture as recited in claim 4, wherein the composition of each of said posts comprises a gradient wherein the composition of the proximal end of said post is substantially identical to the composition of said turbine blade, and wherein the composition of the distal end of said post is substantially identical to the composition of said shields.

6. An article of manufacture comprising a heat barrier to reduce heat transfer between an object and the surroundings, wherein:

(a) the object has a first face whose surface area is at least about 10 cm$^2$;

(b) said heat barrier comprises a substantially continuous layer that is substantially parallel to said first face, and that is connected to said first face by a plurality of at least about 10 microstructures per cm$^2$ of surface area of the first face;

(c) each of said microstructures comprises a distal end and a proximal end;

(d) said distal end of each of said microstructures is connected to said substantially continuous layer;

(e) said proximal end of each of said microstructures is connected to the first face of the object; and (f) the distance between said substantially continuous layer and the first face of the object is between about 0.01 mm and about 2.0 mm;

whereby total heat transfer between the object and the surroundings is substantially less than would be the heat transfer between an otherwise identical object lacking said heat barrier and the surroundings.

7. An article of manufacture as recited in claim 6, wherein the distance between said substantially continuous layer and the first face of the object is between about 0.1 mm and about 1.0 mm.

8. An article of manufacture as recited in claim 6, wherein the object comprises a turbine blade.

9. An article of manufacture as recited in claim 8, wherein said turbine blade comprises a nickel alloy; and wherein said substantially continuous layer comprises a composition selected from the group consisting of Al$_2$O$_3$, Cr$_2$O$_3$, a Ni—Al binary alloy, a Ni—Cr—Al ternary alloy, and a Ni—Cr—Al—Y quaternary alloy.

10. An article of manufacture as recited in claim 9, wherein the composition of each of said posts comprises a gradient wherein the composition of the proximal end of said post is substantially identical to the composition of said turbine blade, and wherein the composition of the distal end of said post is substantially identical to the composition of said substantially continuous layer.

11. An article of manufacture comprising a heat barrier to reduce heat transfer between an object and the surroundings, wherein:

(a) the object has a face whose surface area is at least about 10 cm$^2$;

(b) said heat barrier comprises a plurality of at least about 10 microstructures connected to said first face, wherein adjacent microstructures are spaced between about 10 μm and about 500 μm apart from one another; and (c) each of said microstructures comprises a wall substantially perpendicular to said face, to partially enclose and thereby inhibit heat transfer near said face, wherein said wall is at least about 0.1 mm tall in the direction perpendicular to said face, and wherein the height of said microstructures is at least about 5 times the distance between adjacent microstructures;

whereby total heat transfer between the object and the surroundings is substantially less than would be the heat transfer between an otherwise identical object lacking said heat barrier and the surroundings.

12. An article of manufacture as recited in claim 11, where adjacent microstructures are spaced between about 20 μm and about 50 μm apart from one another; wherein said wall is at least about 0.5 mm tall in the direction perpendicular to said face; and wherein the height of said microstructures is at least about 10 times the distance between adjacent microstructures.

13. An article of manufacture as recited in claim 11, wherein the object comprises a turbine blade.

14. An article of manufacture comprising a heat sink to augment heat transfer between an object and the surroundings, wherein:

(a) the object has a face whose surface area is at least about 1 cm$^2$;

(b) said heat sink comprises a plurality of at least about 1000 microposts per cm$^2$ of surface area of the face, wherein each of said microposts has a distal end and a proximal end;

(c) said proximal end of each of said microposts is connected to the face;

(d) said distal end of each of said microposts is not connected to a shield, wall, or other object that inhibits heat transfer; and (e) the distance between the proximal and distal ends of each of said microposts is between about 0.05 mm and about 1.0 mm, and the aspect ratio of each of said microposts is at least about 5; wherein the aspect ratio of a micropost is the ratio of the distance between the proximal end and the distal end of the micropost to the characteristic dimension of the micropost; wherein the characteristic dimension of a micropost is the diameter of the micropost in a plane perpendicular to a line between the proximal end and the distal end of the micropost;

whereby total heat transfer between the object and the surroundings is substantially greater than would be the heat transfer between an otherwise identical object lacking said microposts and the surroundings.

15. An article of manufacture as recited in claim 14, wherein:
  (a) said heat sink comprises a plurality of at least about 10,000 microstructures per $cm^2$ of surface area of the face;
  (b) the distance between the proximal and distal ends of each of said microposts is at least about 0.1 mm; and
  (c) each said micropost is farther from the nearest neighboring micropost than a distance of about 5 times the diameter of said micropost.

16. A composite material comprising a first layer of a first substance, and a second layer of a second substance that is different from the first substance, wherein:
  (a) each of said layers comprises a proximal face, and the proximal faces of said first and second layers are substantially in contact with one another;
  (b) said proximal face of said first layer is connected to the proximal ends of each of a plurality of at least about 10 microstructures per $cm^2$ of surface area of the proximal face of said first layer, wherein each of said microstructures comprises a proximal end and a distal end;
  (c) the distance between the proximal and distal ends of each of said microstructures is between about 0.01 mm and about 0.5 mm, and the aspect ratio of each of said microstructures is at least about 5; wherein the aspect ratio of a microstructure is the ratio of the distance between the proximal end and the distal end of the microstructure to the characteristic dimension of the microstructure; wherein the characteristic dimension of a microstructure is the diameter of the microstructure in a plane perpendicular to a line between the proximal end and the distal end of the microstructure; and
  (d) the shape of said proximal face of said second layer is substantially complementary to said microstructures;

whereby the adhesion between said first and second layers is substantially greater than would be the adhesion between two otherwise identical layers lacking said microstructures.

17. A composite material as recited in claim 16, wherein:
  (a) said proximal face of said first layer is connected to the proximal ends of each of a plurality of at least about 100 microstructures per $cm^2$ of surface area of the proximal face of said first layer;
  (b) the distance between the proximal and distal ends of each of said microstructures is between about 0.1 mm and about 0.5 mm, and the aspect ratio of each of said microstructures is at least about 10; and
  (c) each of said microstructures is closer to the nearest neighboring microstructure than a distance of about 5 times the width of said microstructure.

18. A composite material as recited in claim 16, wherein the shape of said microstructures is such that said microstructures are physically interlocked securely with said second layer, even disregarding any chemical bonding that may exist between said microstructures and said second layer.

19. An article of manufacture comprising an acoustic barrier to reduce transmission of sound having a frequency above a characteristic frequency through an object, wherein:
  (a) the object has a first face whose surface area is at least about 10 $cm^2$;
  (b) said acoustic barrier comprises a plurality of at least about 50 microstructures per $cm^2$ of surface area of the first face, wherein said microstructures are connected to the first face;
  (c) each of said microstructures has a natural vibrational frequency below the characteristic frequency;

whereby transmission of sound above the characteristic frequency through the object is substantially less than would be the transmission of sound through an otherwise identical object lacking said acoustic barrier.

20. An article of manufacture as recited in claim 19, wherein said acoustic barrier comprises a plurality of at least about 500 microstructures per $cm^2$ of surface area of the first face.

* * * * *